United States Patent
Otsuka et al.

(10) Patent No.: US 7,323,205 B2
(45) Date of Patent: Jan. 29, 2008

(54) PRODUCTION PROCESS OF PACKAGED GREEN TEA BEVERAGES

(75) Inventors: Kazuhiro Otsuka, Tokyo (JP); Wataru Mizuno, Tokyo (JP); Koji Hanaoka, Tokyo (JP); Yuji Matsui, Tokyo (JP); Hideyuki Takatsu, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 11/366,408

(22) Filed: Mar. 3, 2006

(65) Prior Publication Data

US 2006/0147603 A1    Jul. 6, 2006

Related U.S. Application Data

(63) Continuation of application No. 11/016,863, filed on Dec. 21, 2004, now abandoned.

(30) Foreign Application Priority Data

Dec. 22, 2003  (JP) .............................. 2003-424556
Mar. 9, 2004   (JP) .............................. 2004-065110

(51) Int. Cl.
    *A23F 3/00*       (2006.01)
(52) U.S. Cl. ....................... 426/597; 426/106; 426/590
(58) Field of Classification Search ................ 426/597, 426/106, 590
    See application file for complete search history.

(56) References Cited

U.S. PATENT DOCUMENTS

| | | |
|---|---|---|
| 4,528,200 A | 7/1985 | Coleman |
| 4,673,530 A | 6/1987 | Hara et al. |
| 4,913,909 A | 4/1990 | Hara et al. |
| 5,318,986 A | 6/1994 | Hara et al. |
| 5,863,581 A | 1/1999 | Barrett et al. |
| 2003/0077374 A1 | 4/2003 | Ohishi et al. |
| 2003/0096050 A1 | 5/2003 | Inaoka et al. |
| 2005/0095343 A1 | 5/2005 | Ogura et al. |

FOREIGN PATENT DOCUMENTS

| | | |
|---|---|---|
| CA | 53-29999 | 3/1978 |
| CA | 1094871 | 2/1981 |
| JP | 57-29250 | 2/1982 |
| JP | 59-219384 | 12/1984 |
| JP | 61-238728 | 10/1986 |
| JP | 62-278948 | 12/1987 |
| JP | 3-133928 | 6/1991 |
| JP | 4-45744 | 2/1992 |
| JP | 4-311348 | 11/1992 |
| JP | 10-248501 | 9/1998 |
| JP | 2000-508916 | 7/2000 |

*Primary Examiner*—Anthony Weier
(74) *Attorney, Agent, or Firm*—Oblon, Spivak, McClelland, Maier & Neustadt, P.C.

(57) ABSTRACT

A process is described for the production of a packaged green tea beverage containing non-polymer catechins at a concentration of 0.05 to 0.5 wt. %. According to the process, an aluminosilicate which has an iron release rate of not greater than 0.8 mg/kg to a catechin-containing solution is brought into contact with a green tea mixture of a green tea extract and a concentrate of green tea extract. The present invention can provide beverages, which contain catechins at high concentration and inhibit the formation of dregs during long-term storage.

2 Claims, No Drawings

PRODUCTION PROCESS OF PACKAGED GREEN TEA BEVERAGES

FIELD OF THE INVENTION

This invention relates to packaged green tea beverages and their production process.

BACKGROUND OF THE INVENTION

As effects of catechins, there have been reported an inhibitory effect on α-amylase activity and the like (see, for example, JP-A-03-133928). To such a physiological effect to manifest, it is necessary for an adult to drink tea as much as 4 to 5 cups in a day. Accordingly, there has been a demand for a technology that enables the addition of catechins at high concentration in beverages to facilitate the ingestion of a large amount of catechins. As one of methods for this, catechins are added in a dissolved form to a beverage by using a green tea extract (see, for example, JP-A-59-219384).

Packaged beverages of green tea are accompanied by the problem of dregs caused by high molecular components such as pectin and hemicellulose during long-term storage, and a variety of methods have been reported for its resolution, including the use of an ultrafiltration membrane (see, for example, JP-A-4-45744).

Treatment methods using various adsorbents, without using any ultrafiltration membrane, have also been attempted (see, for example, JP-A-62-278948 and JP-A-57-29250)

Concerning the technology on the application of zeolite to tea leaves, on the other hand, the addition of zeolite to green tea leaves or to a substance derived from green tea leaves has been studied (see, for example, Published Japanese Translation No. 2000-508916 of PCT International Application).

SUMMARY OF THE INVENTION

In one aspect of the present invention, there is provided a packaged green tea beverage with a concentrate of green tea extract mixed therein. The packaged green tea beverage contains:

(a) 0.05 to 0.5 wt. % of non-polymer catechins in which the weight ratio [(A)/(B)] of (A) non-epicatechins to (B) epicatechins is 0.54 to 9.0;
(b) 10 to 30 mg/kg of aluminum ions; and
(c) 10 to 30 mg/kg of silicon ions.

In another aspect of the present invention, there is also provided a process for the production of a packaged green tea beverage containing non-polymer catechins at a concentration of from 0.05 to 0.5 wt. %. The process contains bringing an aluminosilicate, which has an iron release rate of not greater than 0.8 mg/kg to a catechin-containing solution, into contact with a green tea mixture of a green tea extract and a concentrate of green tea extract.

DETAILED DESCRIPTION OF THE INVENTION

The conventional method that removes high molecular components from a green tea extract by filtering the green tea extract through an ultrafiltration membrane is accompanied by the drawback that refined taste components of tea are adsorbed on a filter aid and the flavor and taste characteristic of tea are reduced, although the formation of dregs can be avoided.

The treatment methods, which rely upon various adsorbents without using an ultrafiltration membrane, can be divided into two groups depending upon the adsorbents. The treatment methods in one of the groups (see, for example, JP-62-298948 referred to in the above) eliminate tannin (non-polymer catechins), which is a physiologically-effective component, with silica gel from a tea extract by taking it as a causative substance of a color change and turbidness, and therefore these methods cannot be applied to beverages to be provided for the ingestion of a great deal of catechins.

The treatment methods in the other group (see, for example, JP-57-29250 referred to in the above) make use of a polyamide or the like to lower the content of causative substances of a color change, placing an importance on the prevention of a color change. JP-57-29250 and the like, however, make no mention about a preventive effect for dregs. Further, zeolite and acid clay are not suited for application because they lack practical utility.

The technology on the application of zeolite to tea leaves is intended to assure the development of an attractive red color upon production of black tea leaves from green tea leaves, and Published Japanese Translation No. 2000-508916 of PCT International Application referred to the above does not even make a reference to the prevention of dregs in green tea beverages.

An object of the present invention is to provide a packaged green tea beverage which contains catechins at high concentration and inhibits the formation of dregs during long-term storage, and also its production process.

The present inventors have proceeded with an investigation to inhibit the formation of dregs in a packaged green tea beverage containing catechins at high concentration, during long-term storage. As a result, it has been found that the formation of dregs in a packaged green tea beverage containing non-polymer catechins at high concentration during long-term storage can be inhibited by bringing a specific aluminosilicate into contact with a green tea mixture of a green tea extract and a concentrate of green tea extract.

The term "non-polymer catechins" as used herein is a generic term, which collectively encompasses non-epicatechins such as catechin, gallocatechin, catechingallate and gallocatechingallate, and epicatechins such as epicatechin, epigallocatechin, epicatechingallate and epigallocatechingallate.

Examples of green tea leaves for use in the present invention include tea leaves prepared from green tea leaves of the Genus *Camellia*, for example, *C. sinensis*, *C. assamica* and the *Yabukita* variety, or their hybrids. No particular limitation is imposed on the prepared tea leaves insofar as they are non-fermented tea. Preferred examples of steamed tea leaves include *sencha* (middle-grade green tea), *fukamushicha* (deep-steamed green tea), *gyokuro* (shaded green tea), *kabusecha* (partially shaded green tea), *mushi-tamaryokucha* (steamed, rounded, beads-shaped green tea), and *bancha* (coarse green tea). Preferred examples of roasted tea leaves, on the other hand, include *kamairi-tamaryokucha* (roasted, rounded, beads-shaped green tea) and Chinese green tea.

The green tea extract for use in the present invention can be produced under ordinary extraction conditions. Upon extraction from green tea leaves, the temperature can be altered as needed depending upon the tea leaves to be extracted. In the cases of *sencha* and *mushi-tamaryokucha*, for example, temperature of from 60 to 90° C. is preferred. In the cases of *gyokuro* and *kabusecha*, temperature of from 50 to 60° C. is preferred. In the case of *bancha*, on the other hand, no problem arises even at a temperature of from 90°

C. to the boiling temperature. Upon extraction from green tea leaves, the amount of water can be preferably from 5 to 60 times by weight, more preferably from 5 to 40 times by weight of the green tea leaves. The extraction time from green tea leaves is preferably from 1 to 60 minutes, more preferably from 1 to 40 minutes, even more preferably from 1 to 30 minutes. For example, an extract can be obtained from middle-grade green tea leaves by adding the tea leaves into deionized water heated to 65° C., stirring for 2 minutes or so, allowing them to stand still for 2 minutes or so, removing the tea leaves with a filter, and then removing fine tea leaves with a flannel filter cloth.

As the concentrate of green tea extract for use in the present invention, one obtained by concentrating an extract of green tea leaves in hot water or a water-soluble organic solvent can be mentioned. Examples include those prepared by processes exemplified in detail in JP-A-59-219384, JP-A-4-20589, JP-A-5-260907, JP-A-5-306279, JP-A-2003-219800 and JP-A-2003-304811, respectively. As commercial products, "POLYPHENON™" (product of Mitsui Norin Co., Ltd.), "TEAFURAN™" (product of ITO EN, LTD.), "SUNPHENON™" (product of Taiyo Kagaku Co., Ltd.) and the like can be mentioned. In addition, column-purified products and chemically synthesized products can also be used. As forms of a "concentrate of green tea extract" used herein various forms can be mentioned such as a solid, an aqueous solution and slurry.

The green tea mixture for use in the present invention can be obtained, for example, by mixing a green tea extract from green tea leaves with a concentrate of green tea extract such that the absolute amount of substances in a packaged green tea beverage—said substances are presumed to take part in the formation of dregs with time and including pectin and hemicellulose as causative substances of dregs—can be minimized while raising the concentration of non-polymer catechins as an effective ingredient in the beverage. Here, the mixing ratio of the green tea extract to the concentrate of green tea extract can be adjusted based on the solid concentration of the green tea extract and the concentration of non-polymer catechins in the concentrate of green tea extract such that the concentration of non-polymer catechins in the packaged green tea beverage to be obtained finally falls within the range of from 0.05 to 0.5 wt. %.

The packaged green tea beverage according to the present invention contains non-polymer catechins in a water-dissolved form at a concentration of from 0.05 to 0.5 wt. %, preferably from 0.06 to 0.5 wt. %, more preferably from 0.07 to 0.5 wt. %, even more preferably from 0.08 to 0.5 wt. %, even more preferably from 0.092 to 0.5 wt. %, even more preferably from 0.1 to 0.4 wt. %. From the standpoint of physiological effects, non-polymer catechins can be contained in a water-dissolved form at a concentration of preferably from 0.11 to 0.3 wt. %, more preferably from 0.12 to 0.3 wt. %. A concentration of non-polymer catechins lower than 0.05 wt. % makes it difficult to easily ingest a great deal of catechins at once. A concentration of non-polymer catechins higher than 0.5 wt. %, on the other hand, makes it impossible to make improvements in bitterness and astringency.

The concentration of non-polymer catechins in the present invention is defined based on the total amount of eight types of non-polymer catechins consisting of catechin, gallocatechin, catechingallate, gallocatechingallate, epicatechin, epigallocatechin, epicatechingallate and epigallocatechingallate.

The weight ratio (A/B) of the non-epicatechins (A) to the epicatechins (B) in the packaged green tea beverage according to the present invention may preferably be from 0.54 to 9.0, more preferably from 0.55 to 9.0, even more preferably from 0.67 to 9.0, and even more preferably from 1.0 to 9.0 from the standpoint of controlling a hue change during storage.

For the non-polymer catechins in the packaged green tea beverage according to the present invention, it is preferred that the ratio of total gallocatechins as a generic term, which consist of epigallocatechingallate, gallocatechingallate, epigallocatechin and gallocatechin, to total non-gallocatechins as a generic term, which consist of epicatechingallate, catechingallate, epicatechin and catechin, retain the corresponding ratio in natural green tea leaves.

The percentage of gallates as a generic term, which consist of catechingallate, epicatechingallate, gallocatechingallate and epigallocatechingallate, in the non-polymer catechins in the packaged green tea beverage according to the present invention is preferably 45 wt. % or greater from the standpoint of the effectiveness of physiological action of the non-polymer catechins.

The concentration of aluminum ions in the packaged green tea beverage according to the present invention is from 10 to 30 mg/kg, preferably from 15 to 30 mg/kg, more preferably from 20 to 30 mg/kg. A concentration of aluminum ions lower than 10 mg/kg is not preferred because dregs tend to occur prematurely during storage. Such an excessively low concentration is not suited for the packaged green tea beverage according to the present invention.

The concentration of silicon ions in the packaged green tea beverage according to the present invention is from 10 to 30 mg/kg, because this concentration range of silicon ions keeps the green tea beverage free from the occurrence of dregs for an extended period of time during its storage. A preferred range is from 15 to 35 mg/kg, with the range of from 20 to 30 mg/kg being more preferred.

Aluminum ions and silicon ions may be incorporated in the packaged green tea beverage according to the present invention, for example, by contact-treating the above-described green tea mixture with an aluminosilicate. As aluminosilicates, acid clay, activated clay, zeolite and the like can be mentioned. It was found that the formation of dregs during long-term storage of a packaged green tea beverage could be inhibited for the first time when an aluminosilicate having an iron release rate of not greater than 0.8 mg/kg to a catechin-containing solution was selectively used. Described specifically, the above-described green tea mixture was treated with various aluminosilicates. The use of an aluminosilicate whose release rate was higher than 0.8 mg/kg led to an increase in the content of iron in the green tea mixture, and as a result, the green tea mixture turned into a dark green color. Elution of iron metal from an aluminosilicate does not generally take place in a water dispersion system but it does in a dispersion system of green tea mixture. Unless an aluminosilicate preferably having an iron release rate of not greater than 0.8 mg/kg to a catechin-containing solution is used, coloration takes place, and moreover, long-term storage stability cannot be assured for the resulting packaged green tea beverage.

The release rate of iron from an aluminosilicate into a catechin-containing solution can be measured, for example, by a model system to be described next. Specifically, adding 0.15 wt. % of an aluminosilicate to a model green tea extract in which the concentration of non-polymer catechins is from 0.17 to 0.19 wt. %, the percentage of gallocatechins in all the non-polymer catechins is from 46 to 57 wt. % and the pH is within 6.0±0.4; to subjecting the model green tea extract to adsorption treatment; and then measuring the content of iron in the thus-treated green tea extract. More specifically, 0.15 wt. % of an aluminosilicate (for example, activated clay or zeolite) which is in a dry state is added to the above-described model green tea extract. The resulting mixture is stirred at room temperature for 10 minutes, followed by the filtration through a 0.8-μm membrane filter. The thus-obtained green tea extract is filled in a heat-resistant glass container. After the head space of the container is purged with nitrogen gas, the container is sealed and subjected to sterilization at 121° C. for 10 minutes in an autoclave. Subsequent to the completion of the sterilization, the green tea extract is immediately chilled to 30° C. or lower, and the content of iron in the green tea extract is measured. By such a measuring method, an aluminosilicate whose iron release rate is preferably 0.8 mg/kg or lower can be selected with ease which may hereinafter be referred to as the "specific aluminosilicate".

Examples of the specific aluminosilicate usable in the present invention include activated clay, acid clay, and zeolite. Preferred examples of activated clay include "GALLEON EARTH™ NV", "GALLEON EARTH™ NS" and "GALLEON EARTH™ V1", all of which are products of Mizusawa Chemical Industries, Ltd. Usable examples of zeolite include not only natural zeolites but also synthetic zeolites. Specifically, zeolite P and zeolite 4A are preferred.

Upon contact-treatment of the above-described green tea mixture with the specific aluminosilicate in the present invention, the concentration of the specific aluminosilicate can be preferably from 0.05 to 0.5 wt. %, more preferably from 0.1 to 0.5 wt. %, even more preferably from 0.15 to 0.4 wt. % based on the green tea mixture from the standpoint of the preventive effect for dregs and efficiency.

The contact-treatment temperature of the above-described green tea mixture with the specific aluminosilicate is preferably from 0 to 80° C., more preferably from 10 to 50° C. from the standpoint of obviating the need for cooling facilities and avoiding any potential deterioration of the green tea mixture.

The contact-treatment time of the above-described green tea mixture with the specific aluminosilicate may be preferably from 5 to 120 minutes, more preferably from 5 to 60 minutes from the standpoint of the effect and efficiency of adsorption.

The successful inhibition of dregs during long-term storage by the contact-treatment of the green tea mixture with the specific aluminosilicate is considered to be attributable, but not limited, to the adsorption of dreg-forming substances to the specific aluminosilicate. In other words, the contact-treatment of the green tea mixture with the specific aluminosilicate is, therefore, considered to be equivalent to an adsorption-treatment with the specific aluminosilicate.

After the specific aluminosilicate is added and the green tea mixture is contact-treated with the specific aluminosilicate, the aluminosilicate is removed by filtration.

As a filtration method for use in the present invention, a general method, for example, any one of gravity, pressure and vacuum filtration methods can be used. Upon conducting the filtration, the temperature can be similar to the temperature of contact-treatment of the green tea mixture from the standpoint of the working efficiency. A filter aid may be used as desired to increase the filtration rate. It is also possible to prepare a column packaged with the specific aluminosilicate, allowing the green tea mixture to flow through the column. In this case, no filtration step is required specifically so a labor-saving is feasible.

From the standpoint of providing the non-polymer catechins with chemical stability and facilitating the inhibition of dreg formation during long-term storage, the pH of the packaged green tea beverage according to the present invention is controlled to preferably from 5.0 to 7.0, more preferably from 5.5 to 7.0, even more preferably from 5.6 to 6.4, even more preferably from 6.1 to 6.4 at 25° C.

A bitterness suppressor may be added to the packaged green tea beverage according to the present invention to make it palatable. No particular limitation is imposed on the bitterness suppressor, but a cyclodextrin is preferred. As a cyclodextrin, an α-, β- or γ-cyclodextrin or a branched α-, β- or γ-cyclodextrin can be used. In the packaged green tea beverage according to the present invention, the cyclodextrin can be contained at a concentration of preferably from 0.01 to 0.5 wt. %, more preferably from 0.01 to 0.3 wt. %.

To the packaged green tea beverage according to the present invention, it is possible to add, in combination with the ingredients derived from tea, additives—such as antioxidants, flavorants, various esters, organic acids, organic acid salts, inorganic acids, inorganic acid salts, inorganic salts, colorants, emulsifiers, preservatives, seasoning agents, pH regulators and quality stabilizers—either singly or in combination. Examples of the inorganic acids and inorganic acid salts include phosphoric acid, disodium phosphate, sodium metaphosphate, and sodium polyphosphate. These inorganic acids and inorganic acid salts may be contained preferably at a concentration of from 0.01 to 0.5 wt. %, with from 0.01 to 0.3 wt. % being more preferred, in the packaged green tea beverage according to the present invention.

Similar to general beverages, a molded package made of polyethylene terephthalate as a principal component (so-called PET bottle), a metal can, a paper package combined with metal foils or plastic films, or a bottle can be used as a package for the production of the packaged beverage according to the present invention. The term "packaged beverage" as used herein means a beverage which can be taken without dilution.

The packaged green tea beverage according to the present invention can be produced, for example, by filling the beverage in a package such as a metal can and, when heat sterilization is feasible, conducting heat sterilization under sterilization conditions as prescribed in the Food Sanitation Act. For those which cannot be subjected to retort sterilization like PET bottles or paper packages, a process is adopted such that the beverage is sterilized beforehand under similar sterilization conditions as those described above, for example, at a high temperature for a short time by a plate-type heat exchanger, is cooled to a predetermined temperature, and is then filled in a package. Under aseptic conditions, additional ingredients may be added to and filled in a filled package.

The following examples further describe and demonstrate embodiments of the present invention. The examples are given solely for the purpose of illustration and are not to be construed as limitations of the present invention.

EXAMPLES

<Measurement of Catechins>

A high-performance liquid chromatograph (model: "SCL-10AVP") manufactured by Shimadzu Corporation was used. The chromatograph was fitted with an LC column packed with octadecyl-introduced silica gel, "L-Column, TM ODS" (4.6 mm indiameter×250 mm in length; product of Chemicals Evaluation and Research Institute, Japan). A packaged beverage, which had been filtered through a filter (0.8 μm) and then diluted with distilled water, was subjected to chromatography at a column temperature of 35° C. by gradient elution. A 0.1 mol/L solution of acetic acid in distilled water and a 0.1 mol/L solution of acetic acid in acetonitrile were used as mobile phase solution A and mobile phase solution B, respectively. The measurement was conducted under the conditions of 20 μL injected sample quantity and 280 nm UV detector wavelength.

<Measurements of Iron Content, Silicon Ion Concentration and Aluminum Ion Concentration>

Concerning the Fe concentration, silicon ion concentration and aluminum ion concentration in each sample to be ranked, quantitation was conducted by CIP analysis.

(System)
ICP emission spectrometer, "SPS 3000" (manufactured by
Seiko Instruments, Inc.)
(Measurement Conditions for Inductively Coupled Plasma Emission Spectrometry)
High frequency output: 1.2 KW
Reflected wave input: >2 W
Plasma gas flow rate: 18 L/min
Carrier gas pressure: 2 kgf/cm$^2$
Auxiliary gas flow rate: 1.2 L/min
Chamber gas flow rate: 0.6 L/min
Measurement height: 12 mm above an L/R spectroscope
Measurement wavelength: Al (396.152 nm)
Torch: water-based
Nebulizer: water-based
Chamber: Scott type
(Fe, Si and Al Standard Solutions)
Fe (1000 mg/L) standard solution for atomic absorption spectroscopy (product of Wako Pure Chemical Industries, Ltd.)
Si (1000 mg/L) standard solution for atomic absorption spectroscopy (product of Wako Pure Chemical Industries, Ltd.)
Al (1000 mg/L) standard solution for atomic absorption spectroscopy (product of Wako Pure Chemical Industries, Ltd.)

<Measurement of Lightness>
Color difference meter, "ZE 2000" (manufactured by Nippon Denshoku Industries Co., Ltd.)
Zero-adjustment black plate, "0-ADJ" (manufactured by Nippon Denshoku Industries Co., Ltd.)

The power was turned on. After the color difference meter was left for 15 minutes, "0-ADJ" was inserted in a measurement unit, and calibration was performed relative to a standard. Subsequently, a glass cell was filled to an index mark with a sample. The glass cell was inserted in the measurement unit to perform a measurement. In a color specification system displayed after the measurement, the L-value was used.

<Ranking Method of Dregs>

Each sample to be tested, which was contained in a clear container, was observed for the condition of its content on an illuminator. The day on which dregs were observed for the first time was determined as an occurrence day of dregs.

Test 1

Testing Method
(Preparation of Green Tea Mixture)

A concentrate of green tea extract ["POLYPHENON™" (product of Mitsui Norin Co., Ltd.; content of non-polymer catechins: 33.70 wt. %)] was added to a green tea extract to provide a green tea mixture.

Concentration of non-polymer catechins: 0.18 wt. %
Percentage of catechingallates in total non-polymer catechins: 46 to 57 wt. %
pH after sterilization: 6.2

To an aliquot of the green tea mixture prepared in the above, one of the various activated clays shown in Table 1 was added in an amount of 0.15 wt. % as an outer percentage. The resulting mixture was stirred at room temperature (25° C.) for 10 minutes, followed by the filtration through a 0.8-μm membrane filter. The thus-obtained green tea mixture was filled in a heat-resistant glass container. After the head space of the container was purged with nitrogen gas, the container was sealed and subjected to sterilization at 121° C. for 10 minutes in an autoclave. Subsequent to the completion of the sterilization, the green tea mixture was immediately chilled to 30° C. or lower, and the content of iron in the green tea mixture and the lightness (L-value) and pH of the green tea mixture were measured.

Relationships between the activated clays and the iron contents in the corresponding green tea mixtures of Examples 1-2 and Comparative Examples 1-2 are shown in Table 1.

TABLE 1

|  |  | Example 1 | Example 2 | Comp. Ex. 1 | Comp. Ex. 2 |
| --- | --- | --- | --- | --- | --- |
| Activated clay |  | "GALLEON EARTH ™ V1" (product of Mizusawa Chemical Industries, Ltd.) | "GALLEON EARTH ™ NS" (product of Mizusawa Chemical Industries, Ltd.) | "SA 35" (product of Nippon Kasseihakudo Co., Ltd.) | "SA 80" (product of Nippon Kasseihakudo Co., Ltd.) |
| Iron content | [mg/kg] | 0.5 | 0.8 | 1.0 | 1.2 |
| L-value | [—] | 78 | 74 | 69.5 | 68 |

Test 2

Packaged green tea beverages of Examples 3-7 and Comparative Examples 3-4 obtained in a similar manner as in Test 1 except for the use of the activated clays shown in Table 2 were stored at 55° C., and were observed with time for the development of dregs. The results are shown in Table 2.

TABLE 2

|  | Example 3 | Example 4 | Example 5 | Example 6 | Example 7 | Comp. Ex. 3 | Comp. Ex. 4 |
|---|---|---|---|---|---|---|---|
| Activated clay | "GALLEON EARTH ™ NV" | Same as in Ex. 3 | "GALLEON EARTH ™ V1" | Same as in Ex. 5 | "GALLEON EARTH ™ NS" | "SA 35" | "SAI" |
| Amount added [wt. %] | 0.15 | 0.30 | 0.15 | 0.30 | 0.15 | 0.15 | 0.15 |
| Color tone immediately after adsorption treatment | No problem | No problem | No problem | No problem | No problem | Changed into a dark green color | Changed into a dark green color |
| Occurrence day of dregs | 7th day | 21st day | 7th day | 11th day | 5th day | 4th day | 4th day |
| Overall ranking | feasible | feasible | feasible | feasible | feasible | infeasible | infeasible |

Test 3

Packaged green tea beverages of Examples 8-9 obtained in a similar manner as in Test 1 except for the use of the zeolite shown in Table 3 were stored at 55° C., and were observed with time for the development of dregs (as sterilization conditions, however, UHT sterilization was conducted at 138° C. for 30 seconds). The compositions and ranking results of the packaged green tea beverages of Examples 8-9 and a packaged green tea beverage not subjected to the contact-treatment with the zeolite (untreated product) are shown in Table 3.

TABLE 3

|  |  | Example 8 | Example 9 | Untreated product |
|---|---|---|---|---|
| Activated clay |  | Zeolite P | Same as in Ex. 8 | — |
| Amount added | [wt. %] | 0.05 | 0.1 |  |
| Color tone immediately after adsorption treatment |  | No problem | No problem |  |
| Occurrence day of dregs |  | 13th day | 16th day | 2.5th day |
| Overall ranking |  | feasible | feasible | infeasible |
| Analysis data of packaged beverages |  |  |  |  |
| Concentration of non-polymer catechins | [wt. %] | 0.18 | 0.18 | 0.18 |
| (A)/(B) | — | 1.2 | 1.1 | 1.1 |
| Magnesium ions | [mg/kg] | 21 | 20 | 21 |
| Calcium ions | [mg/kg] | <1.0 | <1.0 | <1.0 |
| Aluminum ions | [mg/kg] | 17 | 28 | 4.8 |
| Silicon ions | [mg/kg] | 15 | 27 | 2.3 |

From the results of Tables 1-3, it was confirmed that the occurrence of dregs in a packaged green tea beverage could be delayed to a target day, that is, to the 5th day at 55° C. (equivalent to 6 months when stored at room temperature) or longer by contact-treatment with the specific aluminosilicate.

What is claimed is:

1. A process for the production of a packaged green tea beverage containing non-polymer catechins at a concentration of 0.05 to 0.5 wt. %, which comprises bringing an aluminosilicate, which has an iron release rate of not greater than 0.8 mg/kg to a catechin-containing solution, into contact with a green tea mixture of a green tea extract and a concentrate of green tea extract, wherein the packaged green tea beverage is a packaged green tea beverage with a concentrate of a green tea extract mixed therein, comprising:
    (a) 0.05 to 0.5 wt. % of non-polymer catechins in which the weight ratio [(A)/(B)] of (A) non-epicatechins to (B) epicatechins is from 0.54 to 9.0;
    (b) 10 to 30 mg/kg of aluminum ions; and
    (c) 10 to 30 mg/kg of silicon ion.

2. A process for the production of a packaged green tea beverage containing non-polymer catechins at a concentration of 0.05 to 0.5 wt. %, which comprises bringing an aluminosilicate, which has an iron release rate of not greater than 0.8 mg/kg to a catechin-containing solution, into contact with a green tea mixture of a green tea extract and a concentrate of green tea extract wherein the aluminosilicate is added in the proportion of 0.05 to 0.5 wt % based on the green tea mixture and wherein the packaged green tea beverage is a packaged green tea beverage with a concentrate of a green tea extract mixed therein, comprising:
    (a) 0.05 to 0.5 wt. % of non-polymer catechins in which the weight ratio [(A)/(B)] of (A) non-epicatechins to (B) epicatechins is from 0.54 to 9.0;
    (b) 10 to 30 mg/kg of aluminum ions; and
    (c) 10 to 30 mg/kg of silicon ion.

* * * * *